(12) United States Patent
Reohr, Jr. et al.

(10) Patent No.: US 6,842,840 B1
(45) Date of Patent: *Jan. 11, 2005

(54) CONTROLLER WHICH DETERMINES PRESENCE OF MEMORY IN A NODE OF A DATA NETWORK

(75) Inventors: Richard D. Reohr, Jr., Hillsboro, OR (US); Brian M. Collins, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 464 days.

This patent is subject to a terminal disclaimer.

(21) Appl. No.: 09/793,751

(22) Filed: Feb. 27, 2001

(51) Int. Cl.⁷ .............................. G11C 8/00; G06F 12/00
(52) U.S. Cl. ..................... 711/172; 711/103; 365/236; 365/185.05; 365/185.35
(58) Field of Search ................................ 711/172, 170, 711/115, 5, 103; 365/189.03, 231.03, 230.02, 236, 185.05, 185.35

(56) References Cited

U.S. PATENT DOCUMENTS

| | | | | |
|---|---|---|---|---|
| 4,303,993 A | * | 12/1981 | Panepinto, Jr. et al. | |
| 4,485,437 A | * | 11/1984 | Kinghorn | |
| 4,787,060 A | * | 11/1988 | Boudreau et al. | |
| 4,926,314 A | * | 5/1990 | Dhuey | |
| 5,164,916 A | * | 11/1992 | Wu et al. | |
| 5,241,643 A | * | 8/1993 | Durkin et al. | |
| 5,786,769 A | * | 7/1998 | Coteus et al. | |
| 5,835,931 A | * | 11/1998 | Brandt et al. | |
| 5,940,586 A | * | 8/1999 | Bealkowski et al. | |
| 6,298,006 B1 | | 10/2001 | Reohr, Jr. et al. | |

* cited by examiner

*Primary Examiner*—Jack Lane
(74) *Attorney, Agent, or Firm*—Paul E. Steiner (57) ABSTRACT

A system for determining whether a memory is connected to a controller in a node of a data network. In order to utilize non-volatile memory elsewhere in the system, it is possible to eliminate the EEPROM which is normally connected to the controller. In order to indicate that the EEPROM is deliberately missing, a pull-up resistor connected to a voltage source is connected to the chip select signal line which normally runs between the controller and the EEPROM. If a high signal is received, the controller knows that the EEPROM is deliberately missing and that non-volatile memory will be provided elsewhere in the system.

25 Claims, 8 Drawing Sheets

CONTROLLER WHICH DETERMINES PRESENCE OF MEMORY IN A NODE OF A DATA NETWORK

CROSS-REFERENCE TO RELATED APPLICATIONS

This application is related to U.S. application Ser. No. 09/476,302 filed December, 1999.

TECHNICAL FIELD

The present invention relates to a controller and memory in a host channel adapter and more particularly to a controller which determines the presence of an EEPROM in a host channel adapter of a data network.

BACKGROUND

A data network generally consists of a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) buses as described in the "PCI Local Bus Specification, Revision 2.1" set forth by the PCI Special Interest Group (SIG) on Jun. 1, 1995, may be utilized to deliver message data to and from I/O devices, namely storage subsystems, and network devices. However, PCI buses utilize a shared memory-mapped bus architecture that includes one or more shared I/O buses to deliver message data to and from storage subsystems and network devices. Shared I/O buses can pose serious performance limitations due to the bus arbitration required among storage and network peripherals as well as posing reliability, flexibility and scalability issues when additional storage and network peripherals are required. As a result, existing interconnect technologies have failed to keep pace with computer evolution and the increased demands generated and burden imposed on server clusters, application processing, and enterprise computing created by the rapid growth of the Internet.

Emerging solutions to the shortcomings of existing PCI bus architecture are InfiniBand™ and its predecessor, Next Generation I/O (NGIO) which have been co-developed by Intel Corporation to provide a standards-based I/O platform that uses a switched fabric and separate I/O channels instead of a shared memory-mapped bus architecture for reliable data transfers between end-nodes, as set forth in the "*Next Generation Input/Output (NGIO) Specification,*" NGIO Forum on Jul. 20, 1999 and the "*InfiniBand™ Architecture Specification,*" the InfiniBand™ Trade Association published in late October 2000. Using NGIO/InfiniBand™, a host system may communicate with one or more remote systems using a Virtual Interface (VI) architecture in compliance with the "*Virtual Interface (VI) Architecture Specification, Version 1.0,*" as set forth by Compaq Corp., Intel Corp., and Microsoft Corp., on Dec. 16, 1997. NGIO/InfiniBand™ and VI hardware and software may often be used to support data transfers between two memory regions, typically on different systems over one or more designated channels. Each host system using a VI Architecture may contain work queues (WQ) formed in pairs including inbound and outbound queues in which requests, in the form of descriptors, are posted to describe data movement operation and location of data to be moved for processing and/or transportation via a data network. Each host system may serve as a source (initiator) system which initiates a message data transfer (message send operation) or a target system of a message passing operation (message receive operation). Requests for work (data movement operations such as message send/receive operations and remote direct memory access "RDMA" read/write operations) may be posted to work queues associated with a given network interface card. One or more channels between communication devices at a host system or between multiple host systems connected together directly or via a data network may be created and managed so that requested operations can be performed.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
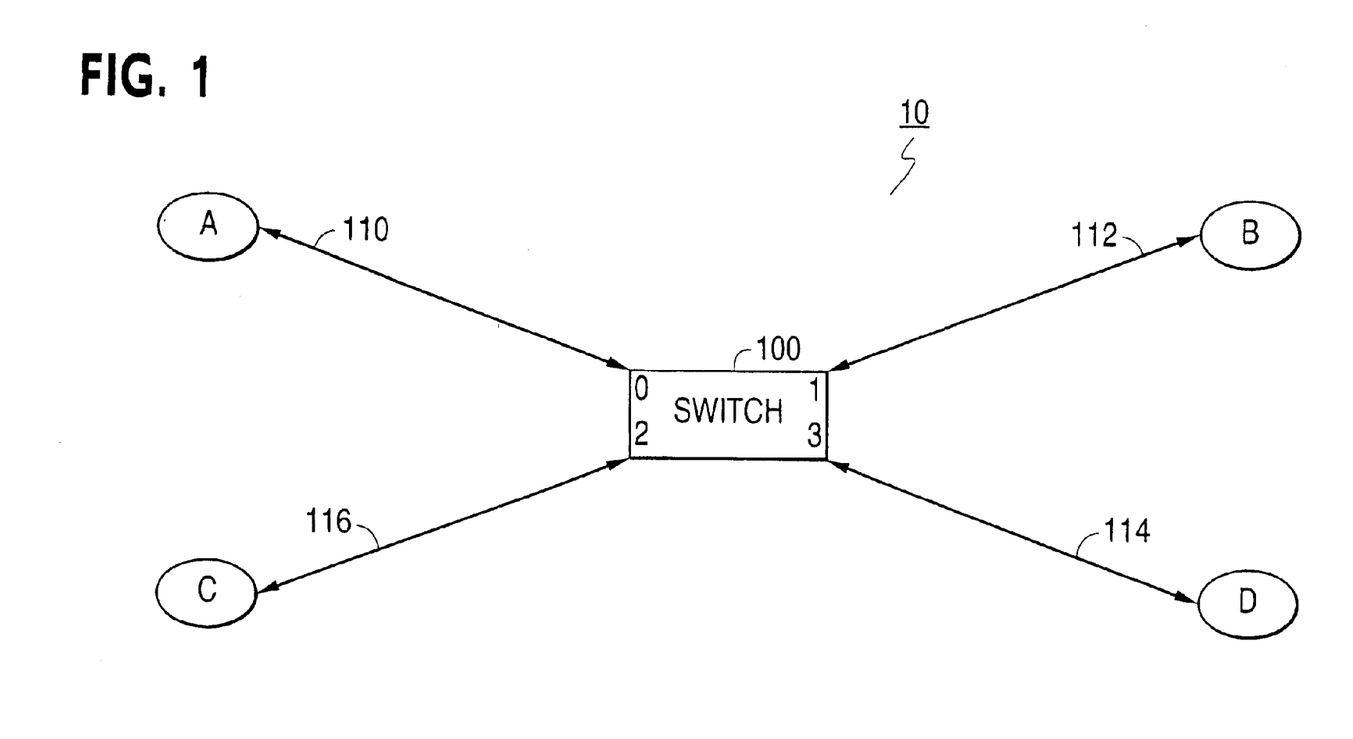
FIG. 1 illustrates an example data network having several nodes interconnected by corresponding links of a basic switch according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical 20, 110, 112, 114, and 116. Each physical link may support a number of logical point o-point channels. Each channel may be a bidirectional communication path for allowing commands and data to flow between two connected nodes (e.g., host systems, switch/switch elements, and I/O units) within the network.

Each channel may refer to a single point-to-point connection where data may be transferred between endpoints (e.g., host systems and 110 units), The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of endpoints or end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the endpoints or end stations (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association on late October 2000. According to the NGIO/InfiniBand™ Specification, the switch 100 may be an NGIO/InfiniBand™ switched fabric (e.g., collection of links, routers, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "*Next Generation I/O Link Architecture Specification: HCA Specification, Revision 1.0*" as set forth by NGIO Forum on May 13, 1999, and/or the *InfiniBand™ Specification* for enabling the endpoints us (nodes) to communicate to each other over an NGIO/InfiniBand™ channel(s).

Figure 2:
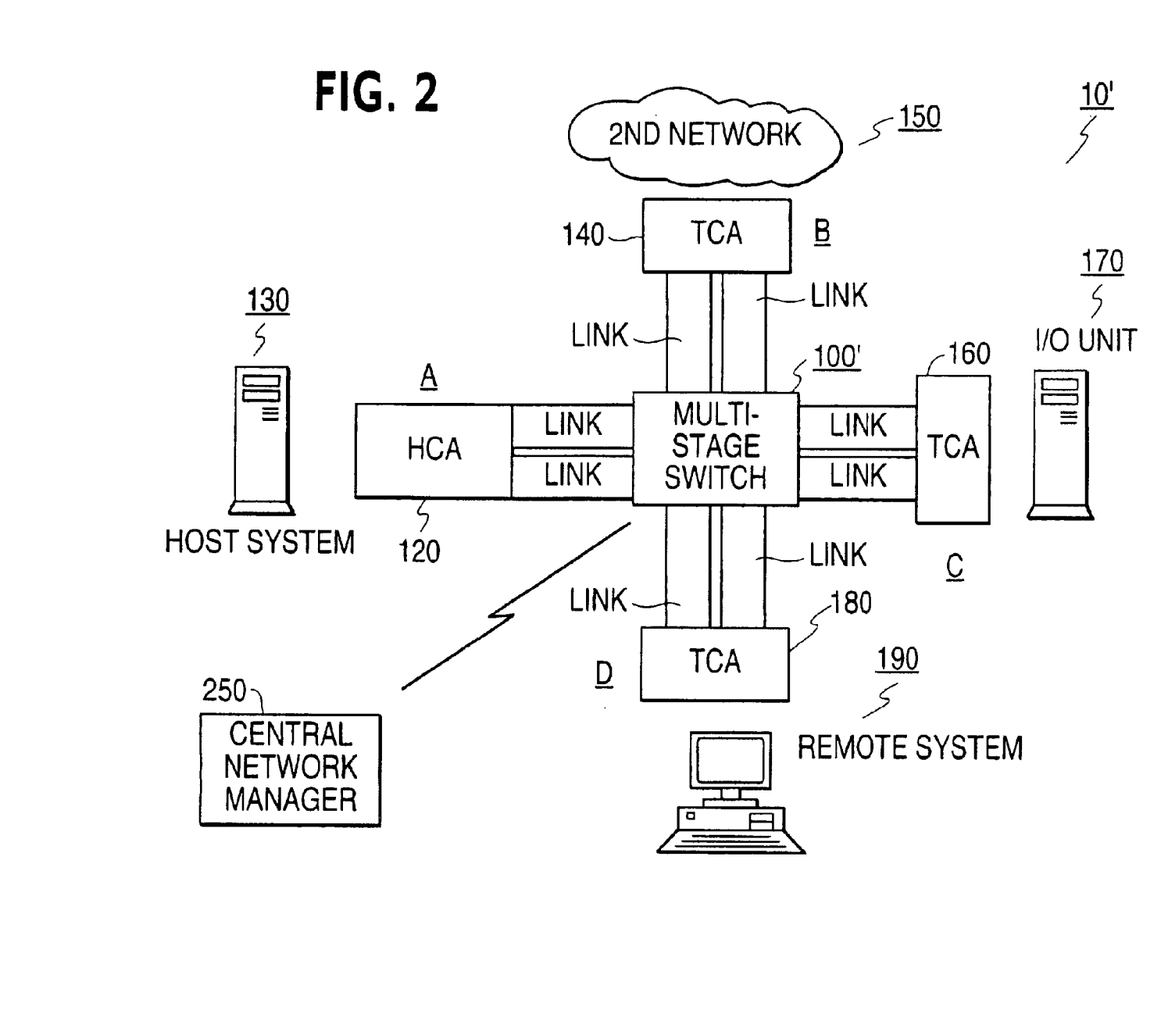
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' (multi-stage switched fabric comprised of a plurality of switches) for allowing a host system and a remote system to communicate to a large number of other host systems and remote systems over one or more designated channels. A channel connection is simply an abstraction that is established over a switched fabric 100' to allow two work queue pairs (WQPs) at source and destination endpoints (e.g., host and remote systems, and IO units that are connected to the switched fabric 100) to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end stations, switches and links may be used for relaying data in groups of cells between the end stations and switches via corresponding NGIO/InfiniBand™ links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO fabric 100' which serve as intermediate nodes between the host system 130 and the remote systems 150, 170 and 190.

The multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions. In either situation, the fabric manager 250 may be configured for learning network topology, determining the switch table or forwarding database, detecting and managing faults or link failures in the network and performing other network management functions.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as fabric adapters provided to interface either the host system 130 or any one of the remote systems 150, 170 and 190 to the switched fabric 1100', and may be implemented in compliance with "*Next Generation I/O Link Architecture Specification: HCA Specification, Revision* 1.0" as set forth by NGIO Forum on May 13, 1999 for enabling the endpoints (nodes) to communicate to each other over an NGIO/InfiniBand™ channel(s). However, NGIO/InfiniBand™ is merely one example embodiment or implementation of the present invention, and the invention is not limited thereto. Rather, the present invention may be applicable to a wide variety of any number of data networks, hosts and I/O units, For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

Figure 3:
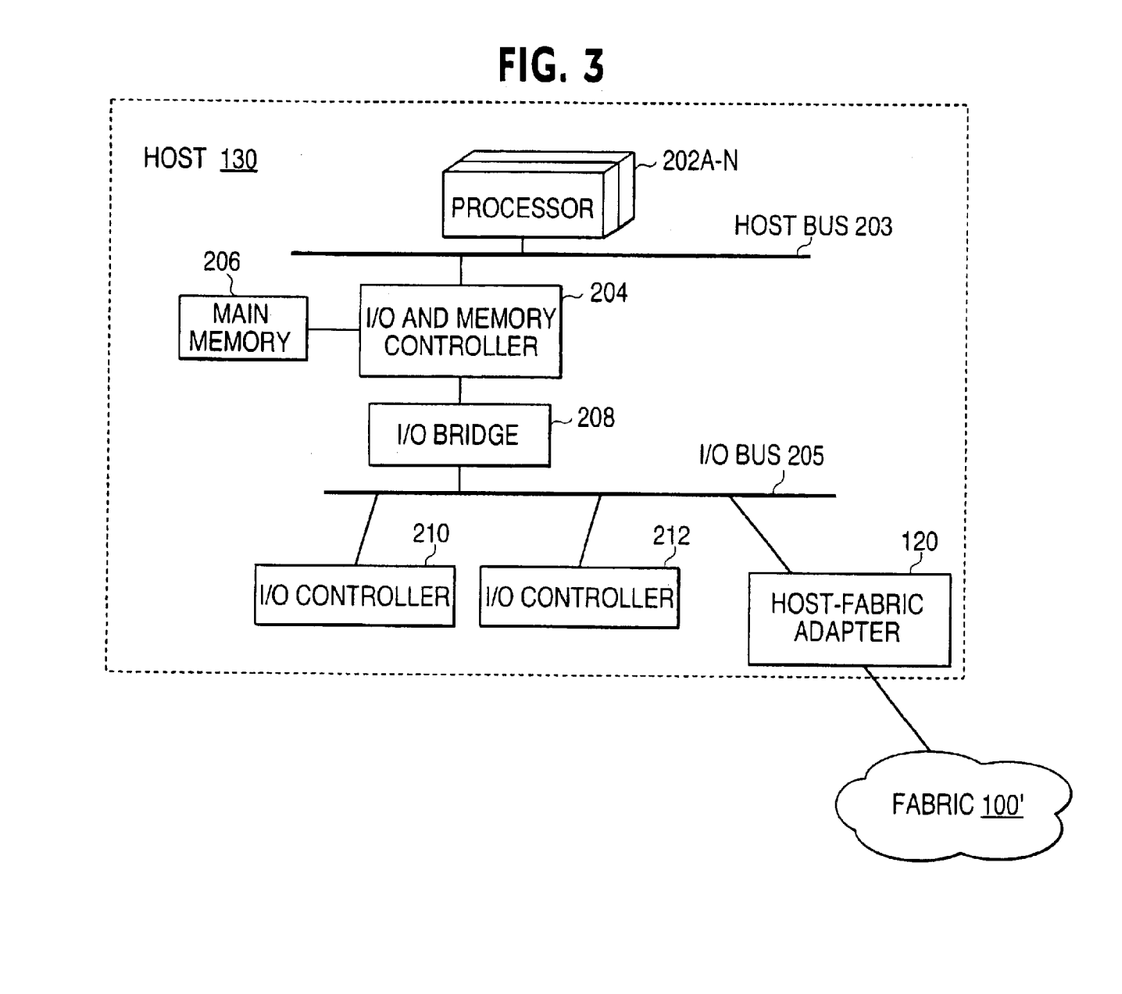
FIG. 3 illustrates a block diagram of an example host system of an example data network according to an embodiment of the present invention.

Returning to discussion, one example embodiment of a host system 130 may be shown in FIG. 3. Referring to FIG. 3, the host system 130 may include one or more processors 202A–202N coupled to a host bus 203. Each of the multiple processors 202A–202N may operate on a single item (I/O operation), and all of the multiple processors 202A–202N may operate on multiple items on a list at the same time. An I/O and memory controller 204 (or chipset) may be connected to the host bus 203. A main memory 206 maybe connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any 110 devices connected thereto) may provide bus-based I/O resources.

One or more host-fabric adapters 120 may also be connected to the I/O bus 205.

Figure 4:
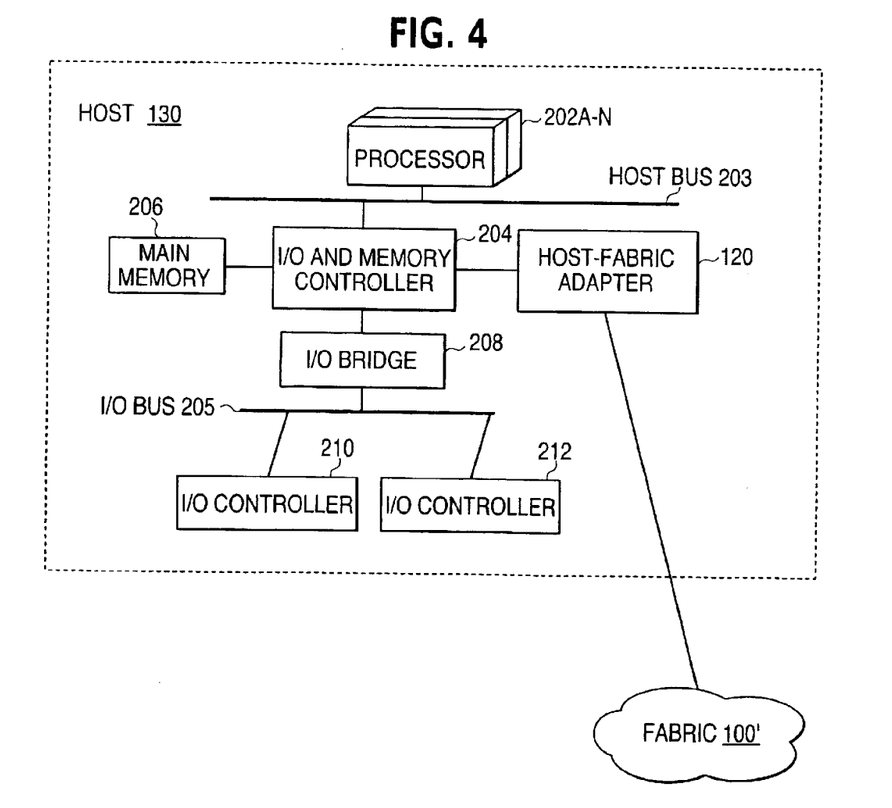
FIG. 4 illustrates a block diagram of an example host system of an example data network according to another embodiment of the present invention.

Alternatively, one or more host-fabric adapters 120 may be connected directly to the I/O and memory controller (or chipset) 204 to avoid the inherent limitations of the I/O bus 205 as shown in FIG. 4. In either embodiment shown in FIGS. 3–4, one or more host-fabric adapters 120 may be provided to interface the host system 130 to the NGIO switched fabric 100'.

FIGS. 3–4 merely illustrate example embodiments of a host system 130. A wide array of system configurations of such a host system 130 may be available. A software driver stack for the host-fabric adapter 120 may also be provided to allow the host system 130 to exchange message data with one or more remote systems 150, 170 and 190 via the switched fabric 100', while preferably being compatible with many currently available operating systems, such as Windows 2000.

Figure 5:
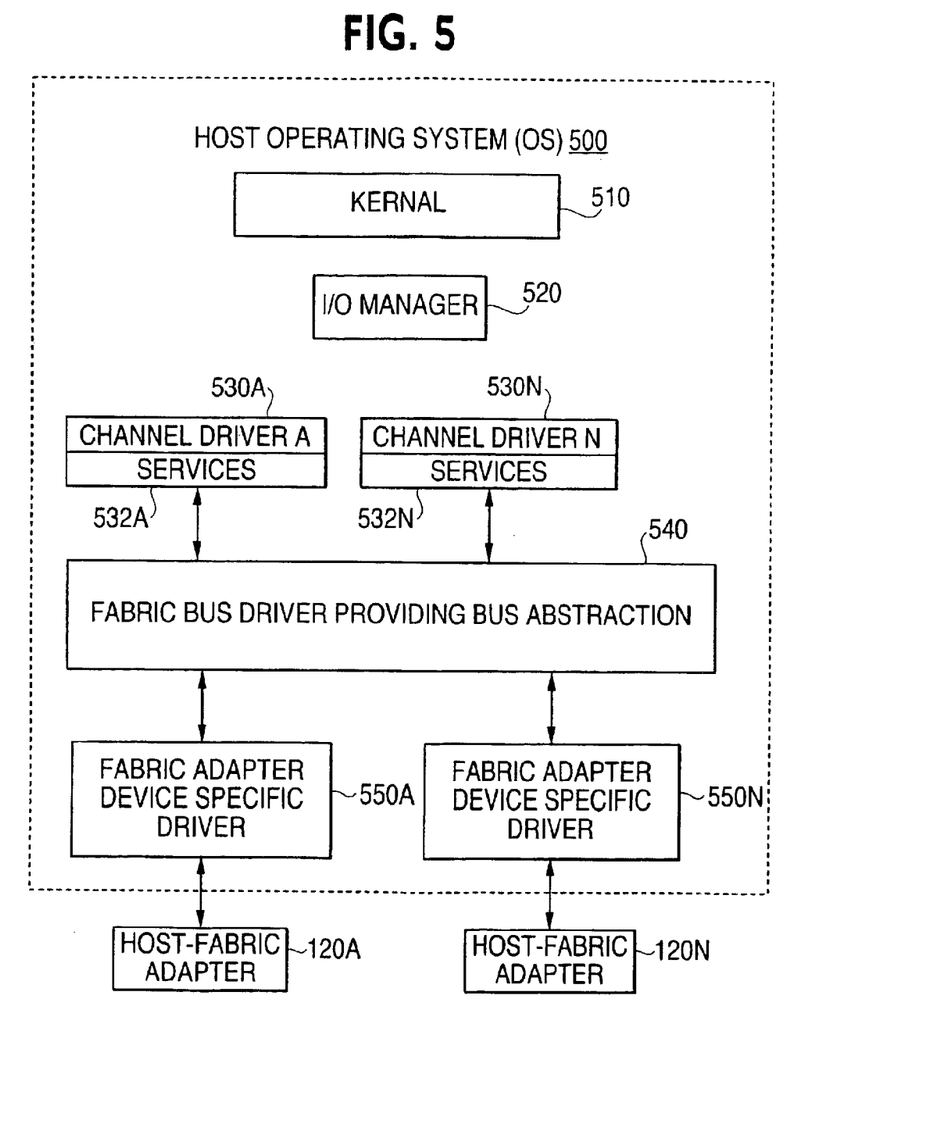
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N for providing an interface to various I/O controllers, and a host-fabric adapter software stack (driver module) including a fabric bus driver 540 and one or more fabric adapter device-specific drivers 550A–550N utilized to establish communication with devices attached to the switched fabric 100' (e.g., I/O controllers), and perform functions common to most drivers. Such a host operating system (OS) 500 may be Windows 2000, for example, and the 1.0 manager 520 may be a Plug-n-Play manager.

Channel drivers 530A–530N provide the abstraction necessary to the host operating system (OS) to perform 10 operations to devices attached to the switched fabric 100', and encapsulate 10 requests from the host operating system (OS) and send the same to the attached device(s) across the switched fabric 100'. In addition, the channel drivers 530A–530N also allocate necessary resources such as memory and Work Queues (WQ) pairs, to post work items to fabric-attached devices.

The host-fabric adapter software stack (driver module) may be provided to access the switched fabric 100' and information about fabric configuration, fabric topology and connection information. Such a host-fabric adapter software stack (driver module) may be utilized to establish communication with a remote system (e.g., I/O controller), and perform functions common to most drivers, including, for example, host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such software driver module may be written using high-level programming languages such as C, C+ F and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter (HCA) driver module may consist of three functional layers: a HCA services layer (HSL), a HCA abstraction layer (HCAAL), and a HCA device-specific driver (HDSD) in compliance with the "*Next Generation I/O Architecture: Host Channel Adapter Software Specification*", the "*Next Generation I/O: Intel HCA Con-* nection Services Layer High Level Design", the "Next Generation I/O: lintel HCA Abstraction Layer High Level Design", and the "Next Generation I/O: Intel HCA Fabric Services Layer High Level Design" as set forth by Intel on Aug. 6, 1999 For instance, inherent to all channel drivers 530A–530N may be a Channel Access Layer (CAL) including a HCA Service Layer (HSL) for providing a set of common services 532A–532N, including fabric services, connection services, and HCA services required by the channel drivers 530A–530N to instantiate and use NGIO/InfiniBand™ protocols for performing data transfers over NGIO/InfiniBand™ channels. The fabric bus driver 540 may correspond to the HCA Abstraction Layer (HCAAL) for managing all of the device specific drivers, controlling shared resources common to all HCAs in a host system 130 and resources specific to each HCA in a host system 130, distributing event information to the HSL and controlling access to specific device functions. Likewise, one or more fabric adapter device-specific drivers 550A–550N may correspond to HCA device-specific drivers (for all type of brand X devices and all type of brand Y devices) for providing an abstract interface to all of the initialization, configuration and control interfaces of one or more HCAs. Multiple HCA device-specific drivers may be present when there are HCAs of different brands of devices in a host system 130.

More specifically, the fabric bus driver 540 or the HCA Abstraction Layer (HCAAL) may provide all necessary services to the host-fabric adapter software stack (driver module), including, for example, to configure and initialize the resources common to all HCAs within a host system, to coordinate configuration and initialization of HCAs with the HCA device-specific drivers, to control access to the resources common to all HCAs, to control access the resources provided by each HCA, and to distribute event notifications from the HCAs to the HCA Services Layer (HSL) of the Channel Access Layer (CAL). In addition, the fabric bus driver 540 or the HCA Abstraction Layer (HCAAL) may also export client management functions, resource query functions, resource allocation functions, and resource configuration and control functions to the HCA Service Layer (HSL), and event and error notification functions to the HCA device-specific drivers. Resource query functions include, for example, query for the attributes of resources common to all HCAs and individual HCA, the status of a port, and the configuration of a port, a work queue pair (WQP), and a completion queue (CQ). Resource allocation functions include, for example, reserve and release of the control interface of a HCA and ports, protection tags, work queue pairs (WQPs), completion queues (CQs). Resource configuration and control functions include, for example, configure a port, perform a HCA control operation and a port control operation, configure a work queue pair (WQP), perform an operation on the send or receive work queue of a work queue pair (WQP), configure a completion queue (CQ), and perform an operation on a completion queue (CQ).

The host system 130 may communicate with one or more remote systems 150, 170 and 190, including I/O units and 110 controllers (and attached I/O devices) which are directly attached to the switched fabric 100' (i.e., the fabric-attached I/O controllers) using a Virtual Interface (VI) architecture in compliance with the "Virtual Interface (VI) Architecture Specification, Version 1.0," as set forth by Compaq Corp., Intel Corp., and Microsoft Corp., on Dec. 16, 1997. VI architecture may support data transfers between two memory regions, typically on different systems over one or more designated channels of a data network. Each system using a VI Architecture may contain work queues (WQ) formed in pairs including inbound (receive) and outbound (send) queues in which requests, in the form of descriptors, are posted to describe data movement operation and location of data to be moved for processing and/or transportation via a switched fabric 100'. The VI Specification defines VI mechanisms for low-latency, high-bandwidth message-passing between interconnected nodes connected by multiple logical point-to-point channels. However, other architectures may also be used to implement the present invention.

Figure 6:
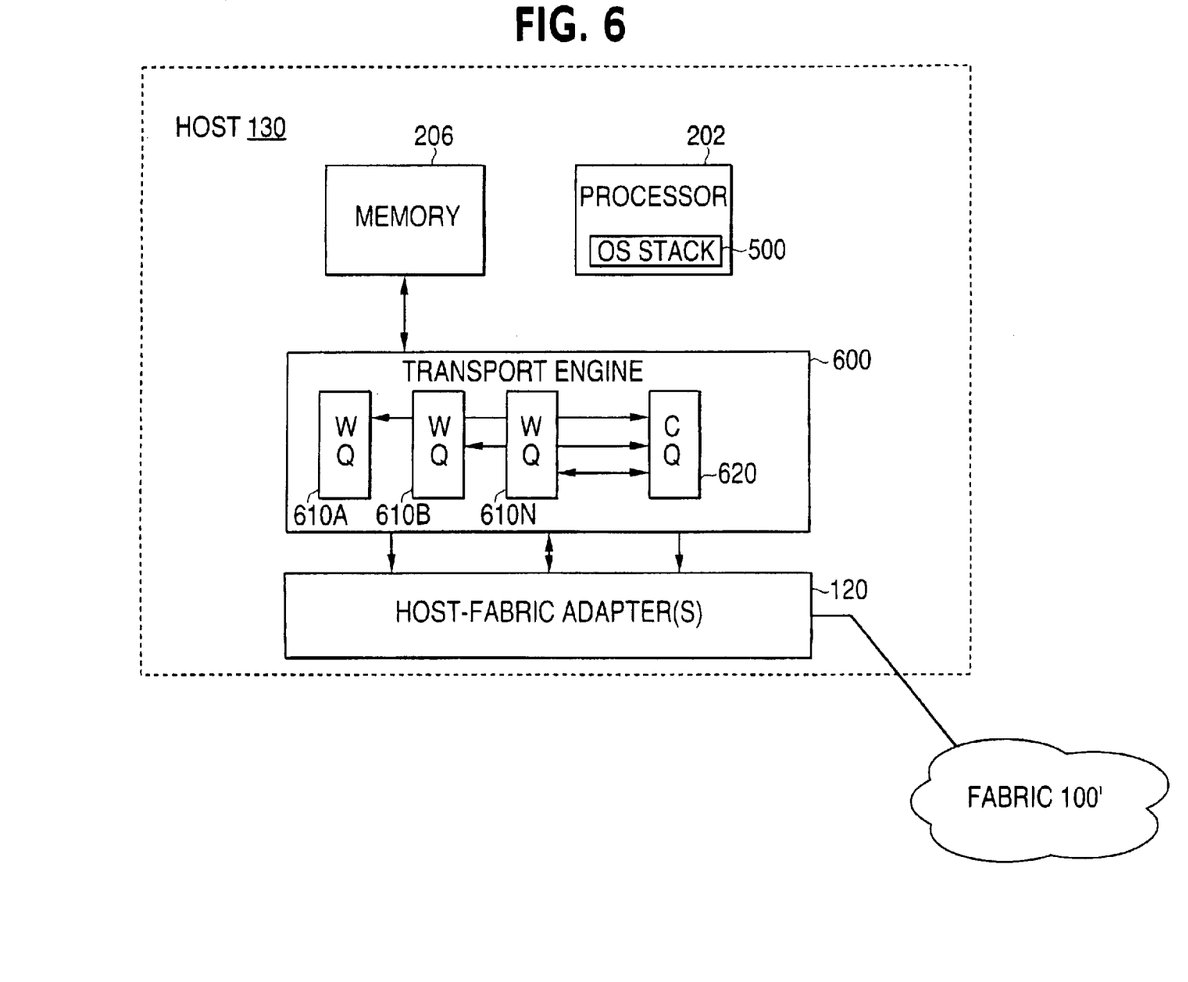
FIG. 6 illustrates a block diagram of an example host system using NGIO/InfiniteBand™ and VI architectures to support data transfers via a switched fabric according to an embodiment of the present invention.

FIG. 6 illustrates an example host system using NGIO/InfiniBand™ and VI architectures to support data transfers via a switched fabric 100'. As shown in FIG. 6, the host system 130 may include, in addition to one or more processors 202 containing an operating system (OS) stack 500, a host memory 206, and at least one host-fabric adapter (HCA) 120 as shown in FIGS. 3–5, a transport engine 600 provided in the host-fabric adapter (HCA) 120 in accordance with NGIO/InfiniBand™ and VI architectures for data transfers via a switched fabric 100'. One or more host-fabric adapters (HCAs) 120 may be advantageously utilized to expand the number of ports available for redundancy and multiple switched fabrics.

As shown in FIG. 6, the transport engine 600 may contain a plurality of work queues (WQ) formed in pairs including inbound (receive) and outbound (send) queues, such as work queues (WQ) 610A–610N in which requests, in the form of descriptors, may beposted to describe data movement operation and location of data to be moved for processing and/or transportation via a switched fabric 100', and completion queues (CQ) 620 may be used for the notification of work request completions. Alternatively, such a transport engine 600 may be hardware memory components of a host memory 206 which resides separately from the host-fabric adapter (HCA) 120 so as to process completions from multiple host-fabric adapters (HCAs) 120, or may be provided as part of kernel-level device drivers of a host operating system (OS). In one embodiment, each work queue pair (WQP) including separate inbound (receive) and outbound (send) queues has a physical port into a switched fabric 100' via a host-fabric adapter (HCA) 120. However, in other embodiments, all work queues may share physical ports into a switched fabric 100' via one or more host-fabric adapters (HCAs) 120. The outbound queue of the work queue pair (WQP) may be used to request, for example) message sends, remote direct memory access "RDMA" reads, and remote direct memory access "RDMA" writes. The inbound (receive) queue may be used to receive messages.

In such an example data network, NGIO/InfiniBand™ and VI hardware and software may be used to support data transfers between two memory regions, often on different systems, via a switched fabric 100'. Each host system may serve as a source (initiator) system which initiates a message data transfer (message send operation) or a target system of a message passing operation (message receive operation). Examples of such a host system include host servers providing a variety of applications or services and I/O units providing storage oriented and network oriented 10 services. Requests for work (data movement operations such as message send/receive operations and RDMA read/write operations) may be posted to work queues (WQ) 610A–610N associated with a given fabric adapter (HCA), one or more channels may be created and effectively managed so that requested operations can be performed.

One particular type of HCA is described in co-pending U.S. application Ser. No. 09/476,302.

As indicated in that application, the HCA may include a controller and a memory connected thereto. Of particular use is an EEPROM (electrically erasable program read only memory) which retains its memory even after power is shut down and also is electrically writeable and erasable. EEPROMs are used in electronic devices for storage of essential information which should be available when the system is initialized. In particular, these memories have been employed for permanent storage of computer system codes or system parameters that do not change.

Figure 7:
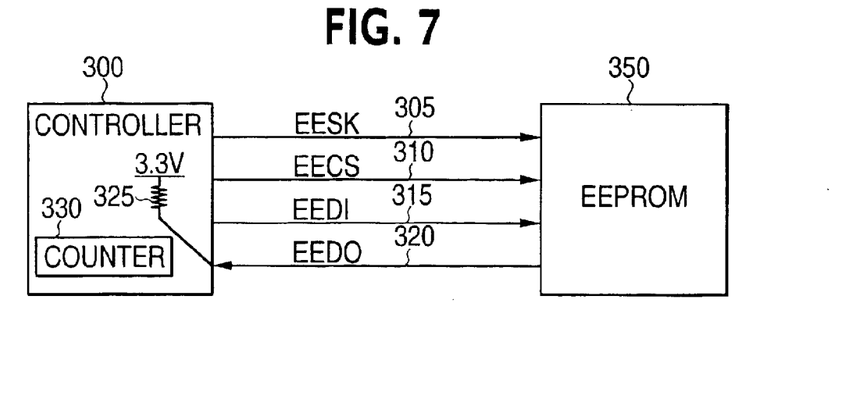
FIG. 7 illustrates a block diagram of a host system having an EEPROM connected to a controller of an example data network.

For a controller which is part of a HCA, it is necessary to have access to non-volatile information which is established at the time of the manufacture of the memory board. Such non-volatile information includes a globally unique identification, the size of an external FLASH, the subsystem vendor, the device identification and the configuration of the ports. An EEPROM can be programmned to store the information. The size of the EEPROM depends on the particular application. However, in order to properly access the information the controller needs to know the size of the EEPROM. Some previous devices have utilized software or dedicated strapping pins in order to indicate the size. However, this increases the complexity of the board and the cost of manufacturing and does not allow the designer to easily adjust the size of the memory. The system shown in FIG. 7 is one attempt to provide flexibility in regard to such a memory. Various different sizes of EEPROMs can be used with the controller and the size determined easily.

FIG. 7 is a block diagram of a controller 300 and an EEPROM 350 connected according to one embodiment of the present invention. The controller 300 provides a plurality is of signals to the EEPROM 350, including a clock signal (EESK) 305, a chip select signal (EECS) 310, and a data-in signal (EEDI) 315. The EEPROM 350 also provides a data-out signal (EEDO) 320 to the controller 300. The controller 300 also includes a counter 330.

The chip select signal 310 is typically a logical low. However, when the controller 300 needs to communicate with the EEPROM 350, the controller changes the chip select signal 310 to a logical high. This activates the EEPROM 350 to begin to receive communications from the controller 300.

The clock signal 305 provides a clock between the controller 300 and the EEPROM 350 to synchronize communications. Once the EEPROM 350 is activated, the controller 300 sends address information over the data-in signal 315. The address information specifies the address location in the EEPROM 350 of the desired information. The EEPROM 350 expects the address to be provided with the most significant bit first. Subsequent address bits are provided serially until the least significant address bit has been transferred over the data-in line 315. While the EEPROM 350 is receiving the address data, the EEPROM floats the data-out line 320. After the last address bit is received, the EEPROM 350 actively drives the data-out line 320 low, indicating to the controller 300 to prepare to receive data. The EEPROM 350 then provides 16 bits of data to the controller 300 over the data-out line 320. This process is repeated until the controller 300 receives all the necessary data.

The controller 300 includes a pull-up resistor 325 connected to the data-out line 320.

The pull-up resistor 325 passively drives the data-out line 320 to a logical high. The pull-up resistor 325 is connected to a control voltage to enable the data-out line 320 to be passively driven high. The control voltage may be, for example, approximately 3.3 volts. The EEPROM 350 overrides the pull-up resistor 325 when the data-out line 320 is actively driven low.

Figure 8:
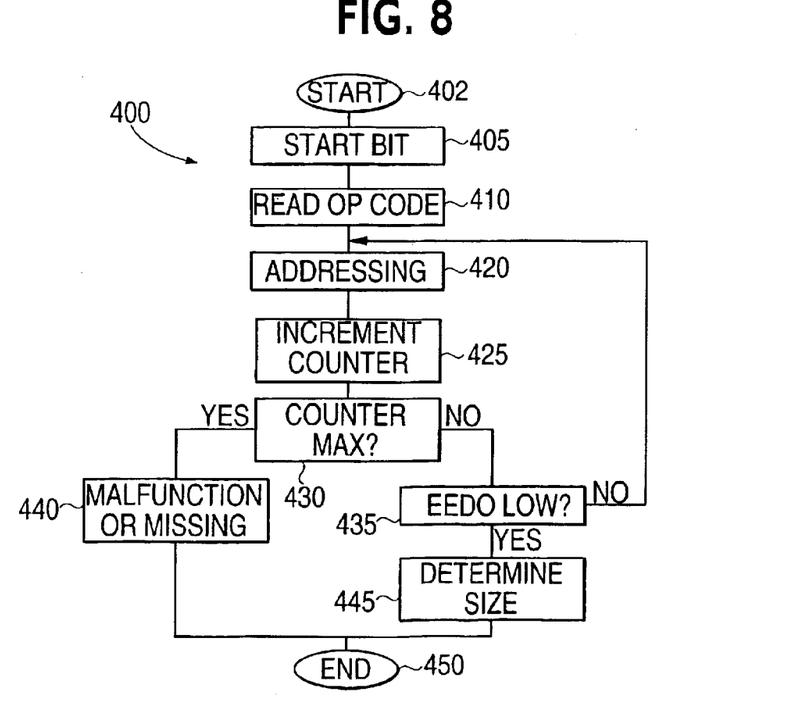
FIG. 8 illustrates a flow chart showing the operation of the example host system described in FIG. 7.

FIG. 8 illustrates the process 400 used to automatically determine the size of the EEPROM 350. The process 400 begins at start state 402. Proceeding to state 405, the controller 300 sends a start bit to the EEPROM 350. The start bit is transmitted along the data-in line 315. Proceeding to state 410, the controller 300 sends a Read OpCode to the EEPROM 350, also along the data-in line 315. The Read OpCode contains 2 bits. The start bit and the Read OpCode indicate to the EEPROM 350 that the controller 300 is about to address the EEPROM 350.

Proceeding to state 420, the controller 300 begins addressing the EEPROM 350 by sending a logical low, or "0" address bit along the data in fine 315. The controller 300 reads from address location zero first, so the initial address data is a series of logical low, or "0" bits. The EEPROM 350 expects the address to be provided with the most significant address bit first and subsequent address bits to be provided serially until the least significant address bit has been transferred.

Proceeding to state 425, after transferring the address bit, the controller 300 increments the counter 330. The counter 330 maintains a constant count of how many address bits have been transferred to the EEPROM 350. The counter 330 may be part of the controller 330 or may be separate from the controller 300.

Proceeding to state 430, the process 400 determines if the counter 330 has exceeded a maximum value. If the EEPROM 350 is either malfunctioning or not present, then the controller 300 cannot communicate with the EEPROM 350. Therefore, the controller 300 may be programmed with the maximum allowable size of an EEPROM 350. For example, if the maximum allowable size of an EEPROM 350 is 64 Kbits, the maximum value for the counter would be 16. If the controller 300 sent over 16 address bits without the EEPROM 350 responding, the EEPROM would either be malfunctioning or not present. Therefore, if the counter 330 exceeds the maximum, the process 400 proceeds along the YES branch to state 440. In state 440, the controller 300 determines that the EEPROM 350 is either malfunctioning or not present. The process 400 then proceeds to end state 450.

Returning to state 430, if the counter 330 has not exceeded the maximum, the process 400 proceeds along the NO branch to state 435, Instate 435, the process 400 determines if the data-in fine 320 from the EEPROM 350 is at a logical low. As stated above, the pull-up resistor 325 passively drives the data-in line 320 to a logical high. In order for the data-in line 320 to be at a logical low, the EEPROM 350 must override the pull-up resistor 325 and actively drive the data-in fine 320 low. The EEPROM 350 drives the data-out fine 320 low when the EEPROM 350 receives the last bit of an address. By driving the data-out line 320 low, the EEPROM 350 communicates to the controller 300 that the EEPROM 350 is ready to transmit data.

If the data-out fine 320 is not at a logical low, the process 400 proceeds along the NO branch back to state 420 where an additional logical low bit, or "0" is transmitted to the EEPROM 350. Because the initial address location to be addressed in the EEPROM 350 is location zero, the process 400 can supply a serial string of logical low bits until the EEPROM is properly addressed, or the maximum permissible size of an EEPROM 350 has been reached. For example, in a 256 bit EEPROM, address location zero would have a binary address of 0000 where address location zero of an 8 Kbit EEPROM would be 000000000. The process 400 would then again increment the counter 330 in state 425, check if the counter exceeded the maximum predetermined value in state 430, and if not, check if the data-in line 320 was at a logical low in state 435. The process 400 remains in this loop sending additional logical low address bits and incrementing the counter 330 until the data-out line 320 is at a logical low or the maximum value of the counter 330 is reached.

Returning to state 435, if the data-out line 320 is at a logical low, the process 400 proceeds along the YES branch to state 445 where the size of the EEPROM 350 is determined from the value of the counter 330. The value of counter 330 equals the number of address bits transmitted to the EEPROM 350 until the EEPROM 350 responded. Therefore, the controller 300 can determine from either a look-up table or by calculations the size of the EEPROM 350.

The look-up table would indicate, for example, if the counter had a value of 0–3 bits that a minimum 256 bit EEPROM should be addressed. If the value of the counter is 4, a 256 bit EEPROM is indicated. If the counter value is 5, a 512 bit EEPROM is indicated. If the counter value is 6, a 1K bit EEPROM is indicated. Similar sizes of EEPROMs are indicated for counter values up to 12. Any counter value above 12 would cause the process to indicate a malfunctioning or non-present EEPROM in state 240 of FIG. 8. However, it would be more desirable to utilize a different arrangement which would detect that the EEPROM is missing before the series of steps indicated in FIG. 8 occurs.

Figure 9:
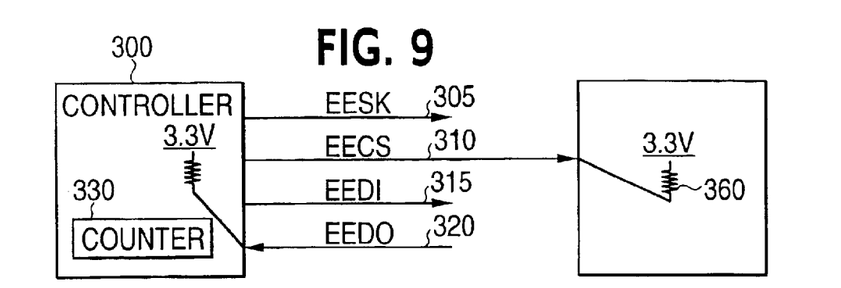
FIG. 9 illustrates a block diagram of an advantageous example host system having a controller without an EEPROM according to an embodiment of the present invention.

FIG. 9 shows a block diagram of an arrangement which would permit the controller to realize immediately that the EEPROM was missing. This arrangement is similar to that shown in FIG. 7, however, an additional pull-up resistor 360 is connected to the chip select signal (EECS) line 310 if no EEPROM is present. This resistor is also connected at the other end to a voltage source of about 3.3 volts. This arrangement allows the controller to determine if the EEPROM is not present without going through the steps necessary to increase the counter until an error is detected. Instead, before any signals are read from the EEPROM, the controller performs a quick check on the EECS pin. The pull-up resistor is connected in place of the EEPROM during the manufacturing process should the manufacturer decide not to connect a memory there. The EECS signal is typically a logic low, as indicated above. However, by having a pull-up resistor in place of the EEPROM, the controller can check the status of the pin before enabling the EECS output enable function. If the controller samples a logical high it knows that the pull-up resistor is overdriving the controllers internal pull-down resistor and aborts the automatic read function.

Thus, this device allows the controller to know whether the memory is present or not. This is important because in some cases it is desirable not to include a memory at this location. Many computer systems have a non-volatile storage elsewhere in the system. Applications exist where the other non-volatile storage can be used by the controller and can provide its required address through other means. Since EEPROMs have a finite cost, it is desirable to leave them out if they are not needed, that is if sufficient non-volatile storage is available elsewhere in the system. Thus, the manufacturer can instead put in a pull-up resistor to indicate that the EEPROM is missing so that the controller avoids the unnecessary steps shown in FIG. 8.

Without this type of function, all controllers in the nodes of this system must have an external EEPROM. By having a way of determining whether the EEPROM is attached, the cost savings can be realized by eliminating the requirement for a dedicated EEPROM.

Figure 10:
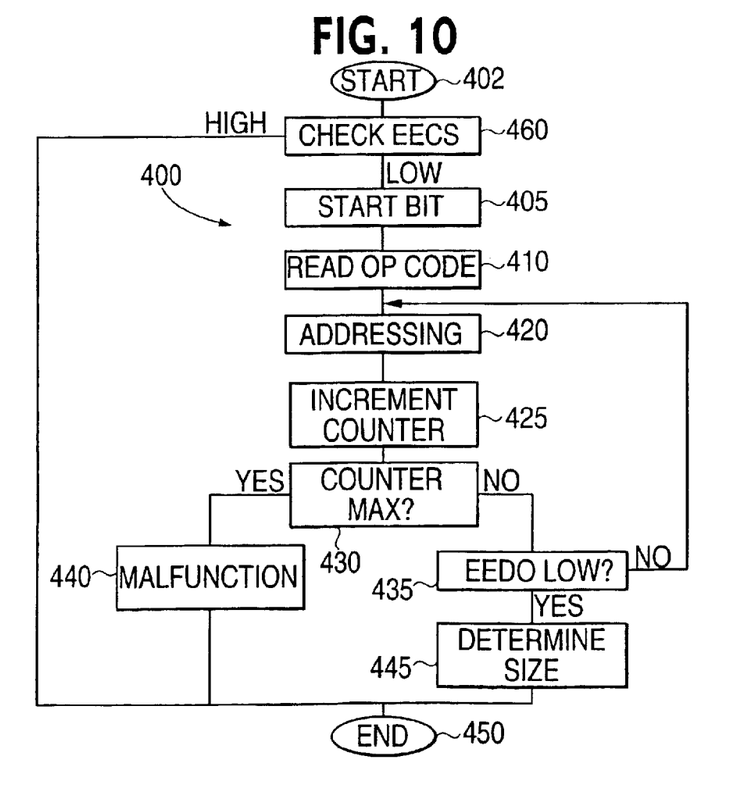
FIG. 10 illustrates a flow chart of an example advantageous host system as shown in FIG. 9.

FIG. 10 is a flowchart which shows the steps followed by the improved device of FIG. 9. The steps are similar to those shown in FIG. 8, except that new state 460 has been inserted between the start state 402 and the sending of the start bit in state 405. State 460 includes the checking by the controller of the EECS line to determine the voltage thereon and to see if it is a logical high or logical low. If a logical high is received, an indication of a missing EEPROM is given and the normal series of steps are bypassed. If a logical low is received, the steps shown in FIG. 8 are then followed in the same sequence. However, in such a situation the state 440 will only indicate whether non-functioning EEPROMS are present.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention by is, therefore, indicated by the appended claims rather than by the foregoing description. All changes which come within the meaning and range of equivalency of the claims are to be embraced within their scope.

What is claimed is:

1. A method, comprising:
   providing a controller including a non-volatile memory component which may or may not be present;
   determining a state of a signal line corresponding to the memory component;
   determining if the memory component is present in accordance with the state of the signal line corresponding to the memory component; and
   if the memory component is determined to be present determining the size of the memory component, wherein determining the size of the memory component comprises:
   providing a series of address bits to the memory component;
   detecting a response from the memory component; and
   determining the size of the memory component from a number of address bits provided to the memory component.

2. The method of claim 1, further comprising:
   omitting the memory component; and
   configuring the state of the signal line to a pre-determined state indicating that the memory component is not present.

3. The method of claim 2, wherein the signal line corresponds to a chip select line, and wherein configuring the state of the chip select line to a pre-determined state comprises:
   connecting the chip select line to a pull-up resistor.

4. The method of claim 1, wherein the controller comprises a fabric adapter for a data network.

5. The method of claim 1, wherein the controller comprises a host channel adapter for a data network.

6. The method of claim 1, wherein the controller comprises a target channel adapter for a data network.

7. The method of claim 1, comprising:
if the memory component is determined to rot be present, reading controller configuration information from another memory.

8. An apparatus, comprising:
a controller; and
a circuit connected to the controller, the circuit being adapted to receive a non-volatile memory component,
wherein the controller is adapted to determine if the memory component is present in the circuit in accordance with a state of a signal line connected between the controller and the circuit,
wherein the controller is further adapted to determine the size of the memory component if the memory component is determined to be present, and wherein to determine the size of the memory component the controller is adapted to:
provide a series of address bits to the memory component;
detect a response from the memory component; and
determine the size of the memory component from a number of address bits provided to the memory component.

9. The apparatus of claim 8, wherein if the memory component is omitted the circuit is adapted to configure the state of the signal line to a pre-determined state indicating that the memory component is not present.

10. The apparatus of claim 9, wherein the signal line corresponds to a chip select line, and wherein the circuit includes, a pull-up resistor connected to the chip select line.

11. The apparatus of claim 8, wherein the controller comprises a fabric adapter for a data network.

12. The apparatus of claim 8, wherein the controller comprises a host channel adapter for a data network.

13. The apparatus of claim 8, wherein the controller comprises a target channel adapter for a data network.

14. The apparatus of claim 8, wherein the controller is further adapted to read controller configuration information from another memory if the memory component is determined to not be present.

15. A system, comprising:
a first mode; and
a second node in communication with the first node,
wherein at least one of the first and second nodes comprises:
 a controller; and
 a circuit connected to the controller, the circuit being adapted to receive a non-volatile memory component,
 wherein the controller is adapted to determine if the memory component is present in the circuit in accordance with a state of a signal line connected between the controller and the circuit,
 wherein the controller is further adapted to determine the size of the memory component if the memory component is determined to be present, and wherein to determine the size of the memory component the controller is adapted to:
provide a series of address bits to the memory component;
detect a response from the memory component; and
determine the size of the memory component from a number of address bits provided to the memory component.

16. The system of claim 15, wherein if the memory component is omitted the circuit is adapted to configure the state of the signal line to a pre-determined state indicating that the memory component is not present.

17. The system of claim 16, wherein the signal line corresponds to a chip select line, and wherein the circuit includes a pull-up resistor connected to the chip select line.

18. The system of claim 15, wherein the controller comprises a fabric adapter for a data network.

19. The system of claim 15, wherein the controller comprises a host channel adapter for a data network.

20. The system of claim 15, wherein the controller comprises a target channel adapter for a data network.

21. The system of claim 15, wherein the controller is further adapted to read controller configuration information from another memory if the memory component is determined to not be present.

22. A method, comprising:
determining if a non-volatile memory component is present; and
if the memory component is determined to be present:
 providing a series of address bit to the non-volatile memory;
 detecting a response from the non-volatile memory; and
 determining a size of the non-volatile memory in accordance with a number of address bits provided to the non-volatile memory.

23. The method of claim 22, wherein the non-volatile memory component comprises an EEPROM.

24. The method of claim 22, wherein determining if the non-volatile memory component is present comprises:
determining a state of a signal line corresponding to the memory component; and
determining if the memory component is present in accordance with the state of the signal line corresponding to the memory component.

25. The method of claim 22, further comprising:
if the memory component is determined to not be present, reading information from another memory.

* * * * *

UNITED STATES PATENT AND TRADEMARK OFFICE
CERTIFICATE OF CORRECTION

PATENT NO. : 6,842,840 B1
DATED : January 11, 2005
INVENTOR(S) : Reohr Jr. et al.

It is certified that error appears in the above-identified patent and that said Letters Patent is hereby corrected as shown below:

Column 3,
Line 42, delete "20," and insert -- link --.
Line 50, delete "110" and insert -- I/O --.

Column 4,
Line 17 after "endpoints", delete "us".

Column 5,
Line 27, delete "1100', " and insert -- 100', --.
Line 37, delete "units," and insert -- units. --.
Line 59, delete "110" and insert -- I/O --.

Column 6,
Line 24, delete "1.0" and insert -- I/O --.
Lines 27 and 29, delete "10" and insert -- IO --.
Line 52, delete "C+ F" and insert -- C++ --.

Column 7,
Line 2, delete "*lintel*" and insert -- *Intel* --.
Line 59, delete "110" and insert -- I/O --.

Column 8,
Line 47, delete "example)" and insert -- example, --.
Line 61, delete "10" and insert -- I/O --.

Column 9,
Line 19, delete "programmned to store the" and insert -- programmed to store this --.
At the beginning of line 34, delete "is".

Column 10,
Lines 18, 51, 56, 57 and 62, delete "fine" and insert -- line --.
Line 50, delete "435, Instate 435," and insert "435. In state 435,".

Column 12,
Line 27, after "invention", delete -- by --.

UNITED STATES PATENT AND TRADEMARK OFFICE
CERTIFICATE OF CORRECTION

PATENT NO. : 6,842,840 B1
DATED : January 11, 2005
INVENTOR(S) : Reohr Jr. et al.

It is certified that error appears in the above-identified patent and that said Letters Patent is hereby corrected as shown below:

Column 13,
Line 1, before "comprising", insert -- further --.
Line 2, delete "rot" and insert -- not --.

Signed and Sealed this

Twenty-eighth Day of June, 2005

JON W. DUDAS
*Director of the United States Patent and Trademark Office*